United States Patent [19]

Kuwayama et al.

[11] 4,432,937

[45] Feb. 21, 1984

[54] ZINC ALLOY FOR USE WITH ELECTRODE

[75] Inventors: Kenta Kuwayama, Tokyo; Junzo Nakagawa; Keishi Tomii, both of Annaka; Kenji Hagimori, Takasaki, all of Japan

[73] Assignee: Toho Aen Kabushiki Kaisha, Tokyo, Japan

[21] Appl. No.: 405,102

[22] Filed: Aug. 4, 1982

[30] Foreign Application Priority Data

Aug. 11, 1981 [JP] Japan ................................ 56-124743

[51] Int. Cl.$^3$ ............................................. C22C 18/00
[52] U.S. Cl. .................................... 420/513; 420/523
[58] Field of Search ............................... 420/513–523, 420/524; 148/441

[56] References Cited

U.S. PATENT DOCUMENTS 2,982,705 5/1961 Sakano et al. ....................... 420/523

FOREIGN PATENT DOCUMENTS 53-85349 7/1978 Japan ................................... 420/513

Primary Examiner—Peter K. Skiff
Attorney, Agent, or Firm—Kane, Dalsimer, Kane, Sullivan and Kurucz

[57] ABSTRACT

An alloy comprising more than 0.01% of gallium and more than 0.01% of indium added to zinc which is usable, as conventional zinc dust or zinc can, for the electrode of a dry cell and shows a high hydrogen overvoltage and evolves less hydrogen gas during storage of the cell.

4 Claims, 3 Drawing Figures

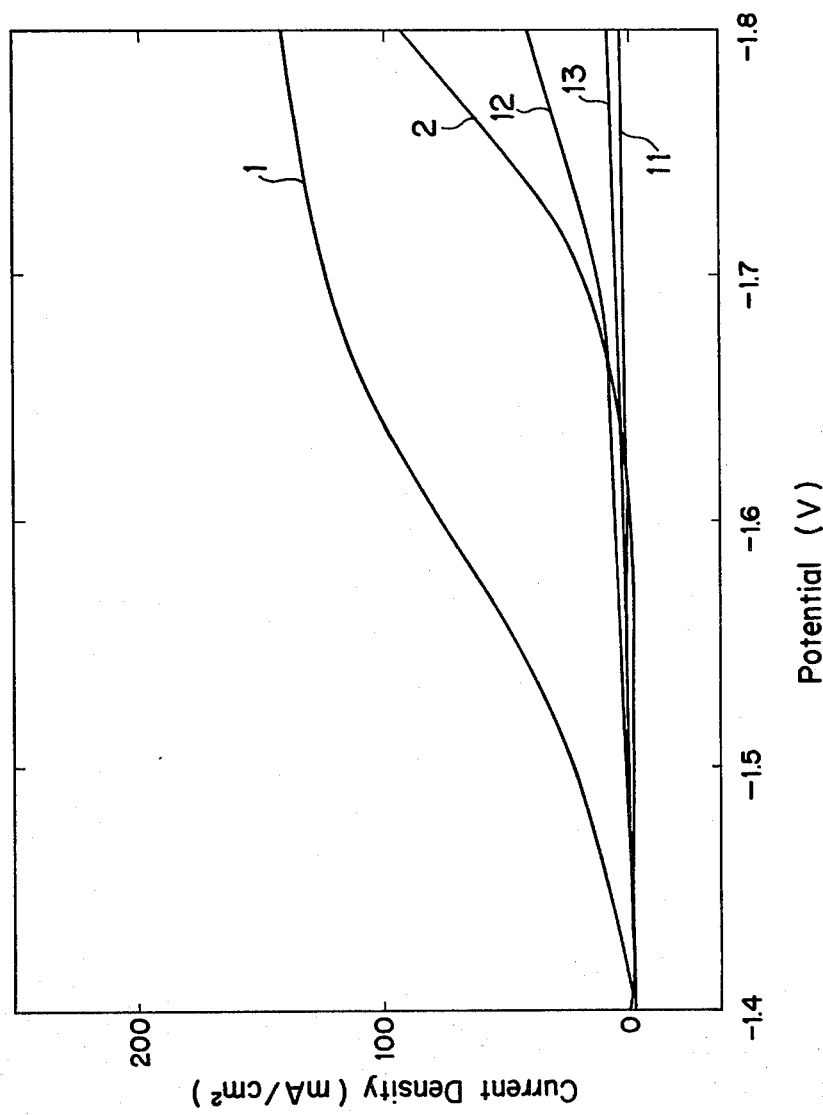

ZINC ALLOY FOR USE WITH ELECTRODE

BACKGROUND OF THE INVENTION

1. Field of the Invention

This invention concerns a zinc alloy containing gallium and indium for use with electrode.

2. Description of the Prior Art

Zinc has hitherto been utilized popularly as electrode material, for example, in electric cells, electric plating and cathodic protection, since zinc, although being a base metal, provides a relatively high hydrogen overvoltage and excellent corrosion resistance, as well as it is available at low cost.

Electrode (cathode) material for use in a dry cell, for instance, has to satisfy the required conditions of causing neither deformation in the cell vessel nor leakage of liquid due to local corrosion or attendant evolution of hydrogen gas. However, usual zinc when used alone in the form of metal can not always satisfy the conditions in such uses partly due to the presence of impurities.

A typical measure generally taken so far for improving the nature of zinc for use with electrode has been the amalgamation of zinc, that is, amalgamation of the inner wall of a zinc can (in contact with electrolyte) in a manganese dry cell or amalgamation of zinc powder (mixed with electrolyte) in an alkali-manganese dry cell. Such amalgamation can effectively increase the hydrogen overvoltage of the zinc electrode, improve the corrosion resistance during storage and suppress the evolution of hydrogen gas. Although the use of mercury for the amalgamation much contributes to the improvement of the dry cell, substitution of mercury with other materials and alternative procedures for the amalgamation have, indeed, been demanded in recent years in view of the prevention of public pollution. As a countermeasure, while the addition of lead, cadmium, indium and the like to zinc has been attempted, none of them can completely overcome the trouble of local corrosion or gas evolution and, accordingly, the use of mercury is still inevitable at present.

Japanese Patent Publication No. 3204/1958 (Sho 33-3204) discloses that the corrosion resistance of zinc in the electrolyte of a dry cell can be improved by the addition of 0.0001–2.0% of indium to zinc. However, the present inventors have made a study on the hydrogen overvoltage having a direct concern with the evolution of hydrogen gas upon discharge of the cell and, as the result, found that although the addition of indium to electrolytic zinc at 99.99% purity is somewhat effective only within a range between 0.01–0.03%, the merit within the range is not so remarkable and the addition of indium out of this range even gives rise to an adverse effect (the reason therefor is not clear at present but it may be considered that the merit obtained by the sole addition of indium is unstable being sensitive to the effect of other impurities).

SUMMARY OF THE INVENTION

The present inventors have already found that a zinc alloy based on electrolytic zinc and containing more than 0.5%, preferably, more than 1% of gallium can improve the hydrogen overvoltage and it can substitute for amalgamated zinc material. However, since gallium is a sort of rare metals and expensive, the inventors have further sought other additives capable of substituting for gallium or being used in combination therewith to thereby decrease the amount of gallium and, after all, have reached a novel alloy capable of significantly increasing the hydrogen overvoltage and thus remarkably decreasing the amount of gas evolved upon contact with the electrolyte, by the addition of less amount of gallium and indium to zinc.

The present invention has thus been accomplished in view of the foregoings and it provides a zinc alloy for use with an electrode, for example, of a dry cell comprising more than 0.01% of gallium and more than 0.01% of indium, which contains no mercury, provides high hydrogen overvoltage, evolves less hydrogen gas and is highly resistant to corrosion.

BRIEF DESCRIPTION OF THE DRAWINGS

The present invention is to be described by way of the accompanying drawings, wherein FIG. 1 to FIG. 3 represent hydrogen overvoltage curves respectively showing advantageous effects of the alloy according to the present invention.

DETAILED DESCRIPTION OF THE PREFERRED EMBODIMENTS OF THE INVENTION

Figure 1:
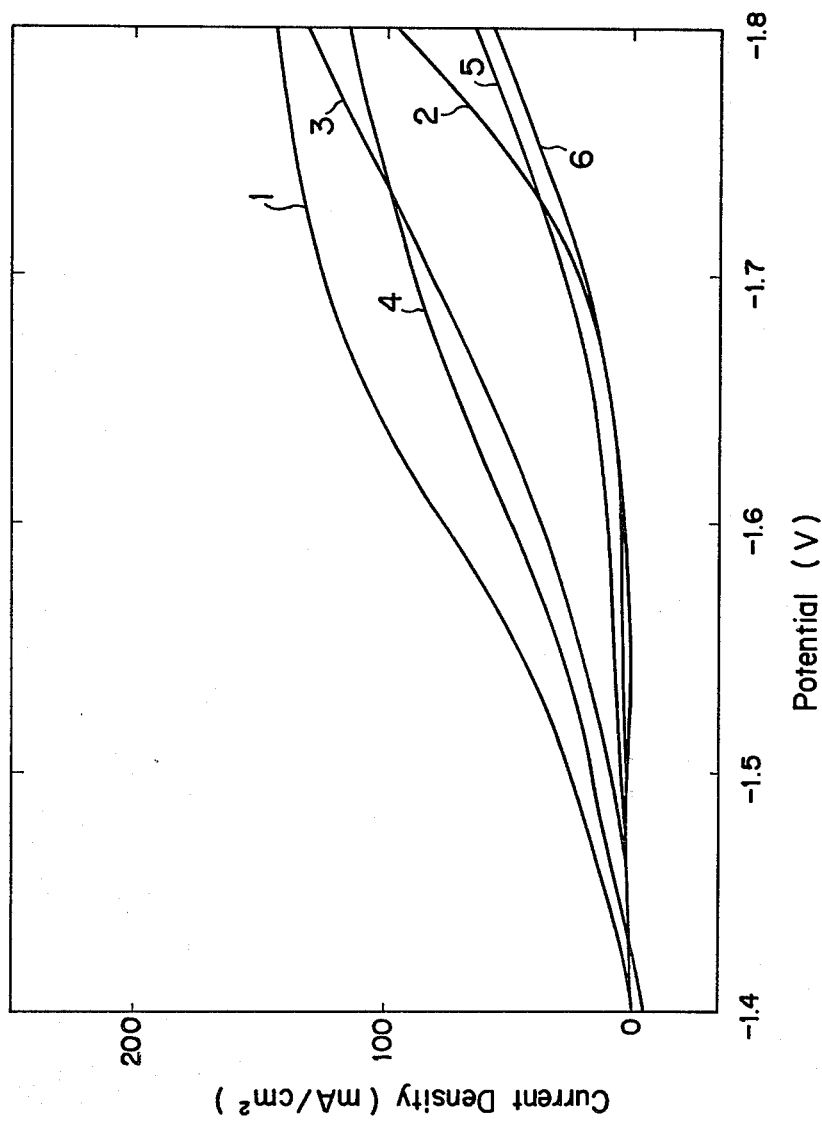

FIG. 1 is a graph for cathode (hydrogen) overvoltage curve which shows the effects of gallium-indium-zinc alloy according to the present invention in comparison with those of the electrolytic zinc and the mercury-coated zinc. In the graph, the ordinate indicates the current density and the abscissa indicates the potential.

The potential was measured by using a mercury sulfate electrode as the reference electrode and 0.1 N aqueous solution of sulfuric acid as the electrolyte, at a liquid temperature of 38° C. and within a potential range from $-1.4$ V to $-1.8$ V with a potential transfer rate at 5 mV/sec.

In FIG. 1, (1) represents a curve for an electrolytic zinc at 99.99% purity, (2) represents a curve for a mercury-coated zinc prepared by coating zinc onto the electrolytic zinc by an amount of 0.2 mg/cm$^2$ which corresponds to the usual concentration of the amalgam layer on a zinc can. (3), (4), (5) and (6) represent curves showing the behaviors of zinc alloys, to which indium was added by 0%, 0.005%, 0.015% and 0.02% respectively with the gallium content maintained at a constant level of 0.01%. As the current density increases, the equilibrium potential at the cathode moves toward the base side, that is, the cathode (hydrogen) overvoltage increases.

In the drawing, the material the curve of which is closer to the abscissa has a greater hydrogen overvoltage. As apparent from the figure, addition effects on the electrolytic zinc are observed in any of the cases and a curve corresponding to that of the mercury coated zinc is given by adding more than 0.01% of indium at a gallium content of 0.01%.

Figure 2:
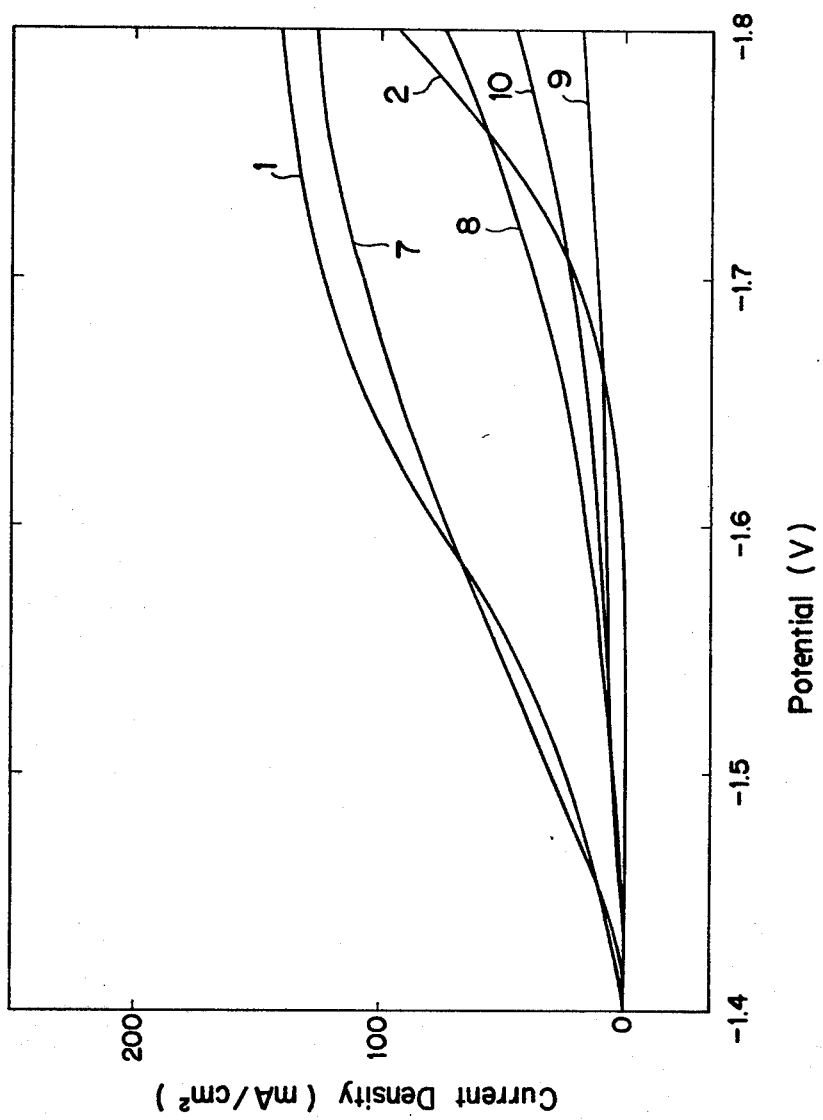

FIG. 2 is a graph similar to that shown in FIG. 1 excepting that it represents the hydrogen overvoltage curves for zinc alloys containing gallium by 0.02% and indium added therewith, wherein (7), (8), (9) and (10) represent the curves for zinc alloys containing gallium at a constant level of 0.02% and indium added by 0%, 0.005%, 0.015% and 0.02% respectively.

While the alloy with no addition of indium shows similar behavior to that of the electrolytic zinc, the alloy containing gallium by 0.02% and indium added therewith by more than 0.005% shows similar behavior to that of the mercury-coated zinc.

FIG. 3 is a graph similar to that in FIG. 1 excepting that it represents the hydrogen overvoltage curves for zinc alloys containing gallium by 0.02% in combination with indium, wherein (11), (12) and (13) represent zinc alloys containing gallium at a constant level of 0.05% and indium added by 0.01%, 0.015% and 0.02% respectively.

In FIG. 3, the potential difference increases remarkably even with a slight increase in the current density in any of the alloys. Specifically, the hydrogen overvoltage is significantly increased to show superior effects even compared with those of the mercury-coated zinc.

It has been known that the corrosion resistance of an electrode is improved and the gas evolution in an electrolyte is suppressed by the increase in the hydrogen overvoltage for the electrode. The present inventors prepared zinc and zinc alloy powder by way of atomizing process and, after the control of the particle size distribution, immersed the powder into the electrolyte for use with an alkali-manganese dry cell comprising 8 N potassium hydroxide saturated with zinc oxide at 45° C. to examine the amount of the gas evolved. Examples of the result are shown in Table 1.

TABLE 1

| No. | Specimen (ingredient %) | | | | | Amount of gas evolved ml/g day |
|---|---|---|---|---|---|---|
|  | Ga | In | Pb | Cd | Ez |  |
| 1 | — | — | — | — | balance | more than 0.8 (scale out) |
| 2 | — | — | 0.15 | 0.05 | " | more than 0.8 (scale out) |
| 3 | — | 0.02 | " | " | " | 0.8 |
| 4 | 0.01 | " | " | " | " | 0.3 |
| 5 | " | 0.03 | " | " | " | 0.08 |
| 6 | 0.1 | 0.02 | " | " | " | 0.005 |
| 7 | " | 0.03 | " | " | " | 0.08 |
| 8 | 0.7 | 0.01 | " | " | " | 0.002 |
| 9 | Hg 5.0 | | | | " | 0.003 |

Ez represents electrolytic zinc at 99.99% purity

As shown in the table, the amount of gas evolved from the zinc alloys containing gallium and indium is extremely small as compared with the case of the electrolytic zinc or fabricating zinc containing lead and cadmium (composition corresponding to that for conventional zinc cans, which show effects similar or superior to those of usual zinc amalgam powder.

While the effects of adding gallium and indium are similar between the electrolytic zinc and the fabricating zinc with each other, the latter shows somewhat superior effect. Table 1 shows only the examples for 0.15% lead content and 0.02% cadmium content, lead and cadmium, particularly, lead shows an additional improvement when it is incorporated in an amount within a certain range to the alloy according to the present invention, and this demonstrates the suitability of the present alloy to the use as the zinc can for a manganese dry cell and as zinc powder for an alkali-manganese dry cell.

Although the alloy according to the present invention is intended to eliminate the use of mercury, it can also be utilized under the condition wherein the mercury is used at a low level.

The effect of the gallium in the alloy according to the present invention is significant and, although it is considered that the addition of gallium constitutes a major effect, the effect for the combined use of indium is also apparent, which can not be expected from individual addition of them. The reason for such a synergistic effect is not clear at present. It is considered for indium that it may be substituted with those metals such as bismuth and tallium that show similar properties to those of indium.

As described above specifically, the alloy according to the present invention can increase the hydrogen overvoltage in the electrolyte and suppress the gas evolution, to thereby provide sufficient effects as the electrode for use with dry cell. Since it has been known that increase in the hydrogen overvoltage can improve the corrosion resistance, suppress the effects of the impurities in zinc and control the local corrosion and attendant gas evolution, the zinc alloy according to the present invention can be utilized also as electrodes in other application uses such as corrosion protection and reductive electrolysis.

What is claimed is:

1. A zinc alloy for use with an electrode comprising more than 0.01% of gallium and more than 0.01% of indium.

2. A zinc alloy for use with an electrode according to claim 1, wherein gallium and indium are added to electrolytic zinc.

3. A zinc alloy for use with an electrode according to claim 1, wherein gallium and indium are added to fabricating zinc containing lead and cadmium.

4. A zinc alloy for use with an electrode according to claim 3, wherein the fabricating zinc contains 0.15% of lead and 0.05% of cadmium.

* * * * *